(No Model.) 2 Sheets—Sheet 1.

E. KAYE.
APPARATUS FOR COOLING GLASS MOLDS.

No. 501,077. Patented July 11, 1893.

Witnesses:
J. B. McGirr.
M. R. Snyder.

Inventor,
Edwd Kaye
by Connell Bro
attys (No Model.) 2 Sheets—Sheet 2.
E. KAYE.
APPARATUS FOR COOLING GLASS MOLDS.
No. 501,077. Patented July 11, 1893.
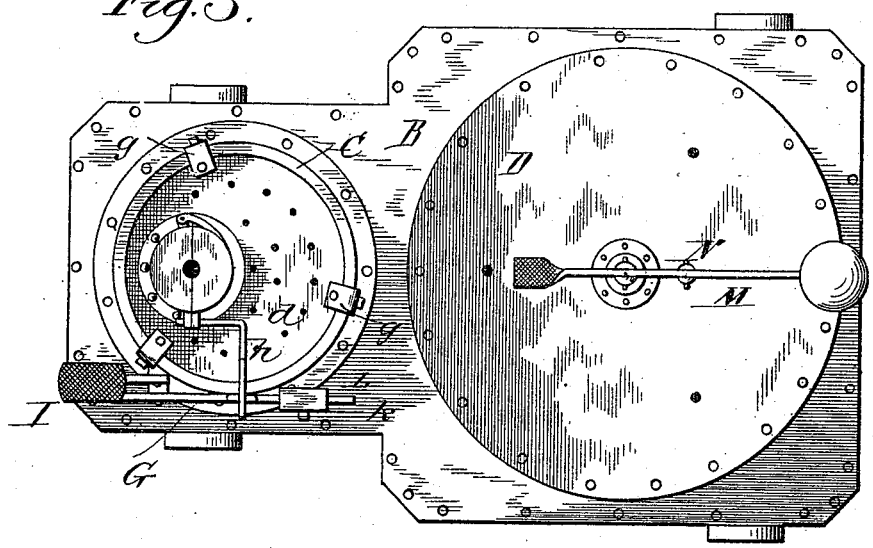
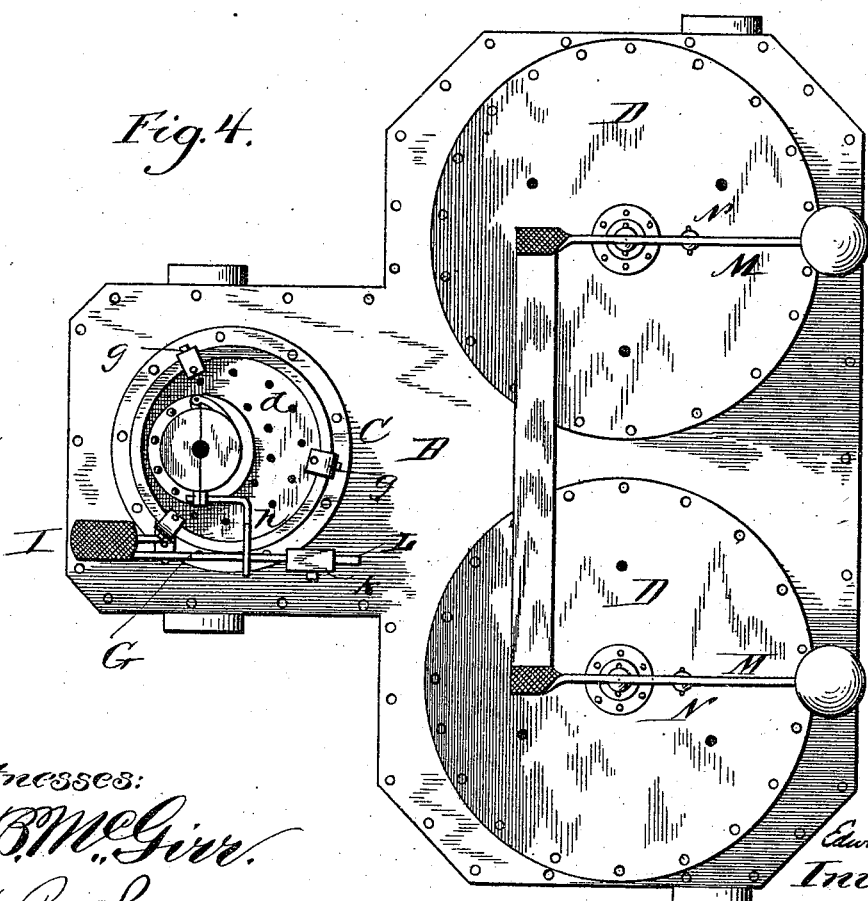
Witnesses:
J. B. McGirr.
M. R. Snyder.
Edw. Kaye
Inventor.
G. Counsell Bro.
Attys.

UNITED STATES PATENT OFFICE.

EDWARD KAYE, OF PHILLIPSBURG, PENNSYLVANIA.

APPARATUS FOR COOLING GLASS-MOLDS.

SPECIFICATION forming part of Letters Patent No. 501,077, dated July 11, 1893.

Application filed February 4, 1893. Serial No. 461,039. (No model.)

*To all whom it may concern:*

Be it known that I, EDWARD KAYE, a citizen of the United States, residing at Phillipsburg, in the county of Beaver and State of Pennsylvania, have invented certain new and useful Improvements in Apparatus for Cooling Glass-Molds; and I do hereby declare the following to be a full, clear, and exact description of the invention, such as will enable others skilled in the art to which it appertains to make and use the same.

My invention has relation to glass molds, and has for its object the provision of means for automatically opening and closing the mold, and for wetting and cooling it after each operation. My aim is to dispense with the necessity of the glass blower's assistant now employed for the purpose, and to enable the blower himself, without interference with, or interruption in, his regular occupation, to easily and quickly open and close the mold, and after the former operation, to entirely submerge the mold in water so as to cool it off and make it ready for the next blow.

My invention consists of an apparatus adapted and designed to effect the objects above stated, and in the novel mechanical constructions and combinations hereinafter described and claimed.

Figure 1:
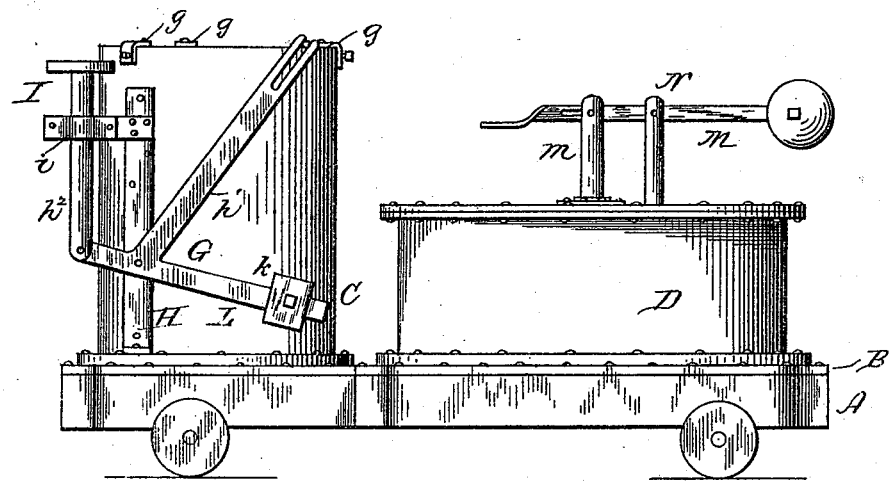
Figure 2:
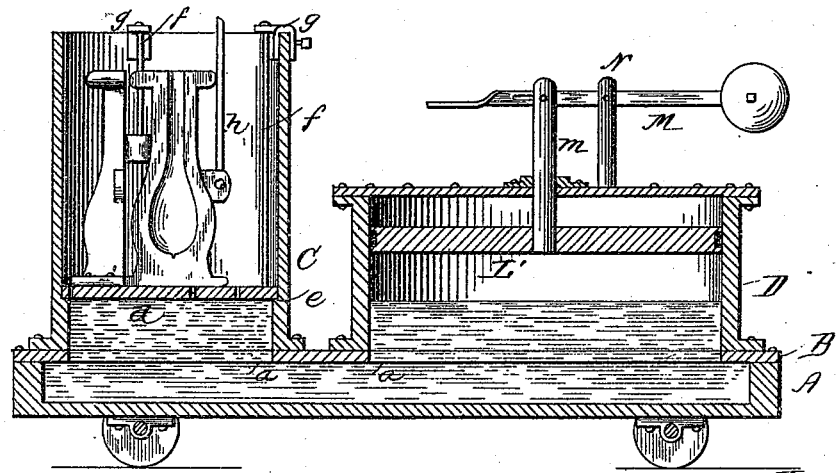

In the accompanying drawings,—Figure 1 is a side elevation of an apparatus embodying my invention. Fig. 2 is a vertical longitudinal sectional view of the same. Fig. 3 is a plan view of the structure shown in Figs. 1 and 2; and Fig. 4 is a plan view of a modified form of apparatus.

The apparatus comprises a suitable receptacle for the mold, wherein it may be submerged in water, after being used, a suitable water reservoir in communication with the mold receptacle and containing a piston to be depressed by the foot of the blower so as to force the water into the mold receptacle and a suitable treadle movement connected with the mold, whereby the latter may be opened and closed as may be required.

A designates the base of the apparatus, consisting of a shallow box-like casting, mounted on wheels for convenience of transportation, and provided with a covering plate B bolted to the base and made water-tight. The covering plate has openings $a, a$, from which rise the mold receptacle C, and the water reservoir D preferably bored, cast iron cylinders properly secured to the base-plate, and open at their bottom ends so as to be in communication through the base cavity. The reservoir D is of sufficient capacity to hold enough water to fill the mold receptacle to the height required to submerge the mold which stands upright in the latter and rests upon a perforated plate $d$ supported near the bottom of the receptacle on a flange $e$. The mold, after being adjusted, is secured in place by adjustable vertical screw-posts $f, f$, depending from clamps $g, g$, secured to the rim of the mold receptacle. The receptacle is designed to hold molds of various heights and may be arranged at the required elevation by the employment of different thicknesses, or numbers of perforated plates. One of the halves of the mold is fixed in position, while the other, which is freely movable to open the mold, carries a bent rod $h$ which projects over the edge of the mold receptacle and engages with a notch in the upper end of the limb $h'$ of a bell crank lever G pivotally attached to the side of the receptacle, or to a conveniently arranged standard H. The other limb $h^2$ of the lever carries a block or foot-piece I and slides through a guide $i$. By depressing the lever through the foot-press, the mold is closed. When the pressure is relieved, the mold is opened by the power of a weight $k$, carried on a lateral extension L of the lever. The reservoir D contains the piston L', the rod $m$ of which rises through the top of the reservoir, and has pivoted to it a weighted treadle M journaled to a standard N.

In operating the apparatus, the blower, after the usual preliminary operations of gathering, elongating and marvering the ball on the blow-pipe, inserts the ball in the mold, and then closes the latter by pressing down the lever by his foot. After he has sufficiently blown and shaped the glass, he releases the lever and allows the mold to open, so that he may withdraw the glass. He then immediately depresses the piston by putting his foot upon the lever and by this means forces the water from the reservoir into the mold receptacle, thus completely submerging the mold. When releasing the piston of the foot pressure, the former is raised by the weight and the water returns to the reservoir. As will be seen, the reservoir is of large diameter, but of little depth, so that the water cannot rise in it above the bottom of the mold, although it will contain below the piston and in the cavity of the base, which forms part of the reservoir, sufficient water to nearly fill the mold receptacle. When large molds are being used, with correspondingly large mold receptacles, two or more reservoirs with separate pistons may be employed, as shown in Fig. 4, as a single reservoir of sufficient capacity would be found clumsy and inconvenient.

In some cases it will be found advantageous to employ pneumatic or steam pressure to drive the water from the reservoir into the receptacle, the air or steam being admitted from a suitable source of supply through a pipe leading into the top of the reservoir.

The treadle movement shown and described for operating the mold is merely illustrative, and any other convenient devices may be used and may be applied without invention by any skilled mechanic.

Having described my invention, I claim as new and desire to secure by Letters Patent—

1. In an apparatus for cooling glass molds, the combination with a suitable base of a receptacle for the mold and a water reservoir in communication therewith, both rigidly secured to said base, and means substantially as described for opening and closing the mold and for alternately forcing water from the reservoir into the mold receptacle and returning it to the reservoir.

2. In an apparatus for cooling glass molds, the combination with a mold receptacle, and a water reservoir in communication therewith, of counterbalanced treadle mechanism for opening and closing the mold, a piston for forcing water from the reservoir into the mold receptacle and counterbalanced treadle mechanism for operating the piston, substantially as described.

3. In an apparatus for cooling glass molds, the combination with a hollow base, of a mold receptacle and water reservoir mounted on said base and communicating with each other through said base, a piston arranged to work inside said reservoir, and suitable treadle mechanism, substantially as described, for opening and closing the mold and for operating the piston, substantially as described.

4. In an apparatus for cooling glass molds, the combination with a mold receptacle and a water reservoir containing a piston and communicating with said receptacle, of a detachable perforated plate fitted in said receptacle and forming the support for the mold, substantially as set forth.

In testimony whereof I affix my signature in presence of two witnesses.

EDWARD KAYE.

Witnesses:
E. T. MORLAN,
A. M. JOHNSON.